US008819596B2

(12) United States Patent
Kela et al.

(10) Patent No.: US 8,819,596 B2
(45) Date of Patent: Aug. 26, 2014

(54) GESTURE CONTROL SYSTEM

(75) Inventors: Juha Kela, Oulu (FI); Panu Korpipää, Oulu (FI); Jani Mäntyjärvi, Oulu (FI); Heikki Keränen, Oulu (FI); Tapani Rantakokko, Oulu (FI); Esko-Juhani Malm, Oulu (FI); Sanna Kallio, Oulu (FI); Jussi Holopainen, Tampere (FI); Jari Kangas, Tampere (FI); Samuli Silanto, Helsinki (FI)

(73) Assignee: Nokia Corporation, Espoo (FI)

( * ) Notice: Subject to any disclaimer, the term of this patent is extended or adjusted under 35 U.S.C. 154(b) by 1379 days.

(21) Appl. No.: 11/049,638

(22) Filed: Feb. 1, 2005

(65) Prior Publication Data

US 2005/0210419 A1    Sep. 22, 2005

(30) Foreign Application Priority Data

Feb. 6, 2004   (FI) .................................... 20040184

(51) Int. Cl.
*G06F 3/033* (2013.01)
(52) U.S. Cl.
USPC ....................................................... 715/863
(58) Field of Classification Search
CPC ....................................................... G06F 3/017
USPC ......... 715/702, 716, 751, 757, 764, 781–787, 715/856–866
See application file for complete search history.

(56) References Cited

U.S. PATENT DOCUMENTS 5,913,727 A * 6/1999 Ahdoot ........................... 463/39
6,304,674 B1 10/2001 Cass et al.
(Continued)

FOREIGN PATENT DOCUMENTS

EP     1408443       4/2004
FI      110549 B     2/2003
(Continued)

OTHER PUBLICATIONS

"Recognizing Movements of a Handheld Device Using Symbolic Representation and Coding of Sensor Signals"; Adrian Flanagan, Jani Mantyjarvi (Nokia Research Center, Helsinki, Finland); Kalle Korpiaho, Johanna Tikanmaki (Helsinki University of Technology, Finland); First International Conference on Mobile and Ubiquitous Multimedia; Dec. 13, 2002, Oulu, Finland.

(Continued)

*Primary Examiner* — Enrique Iturralde
(74) *Attorney, Agent, or Firm* — Alston & Bird LLP (57) ABSTRACT

A control system basing on the use of gestures and functioning especially in mobile terminals. The gesture control system is provided with a general purpose interface (320) with its commands for applications (310) to be controlled. The processing software (330) of the gesture signals includes a training program (331), trained free-form gestures made by the user being stored in the gesture library, and a recognizing program (332), which matches a gesture made by the user to the stored gestures and chooses the most similar gesture thereof. Gestures can hence be used as commands for controlling any application configured or programmed to receive the command. One and the same application functions in different models of mobile terminals without matching, and in a certain mobile terminal all applications can be run, which applications use specified interface commands. The application (310) can be e.g. a game or activity being included in basic implementation of a mobile terminal.

12 Claims, 8 Drawing Sheets

(56) References Cited

U.S. PATENT DOCUMENTS

| | | | |
|---|---|---|---|
| 6,363,160 B1* | 3/2002 | Bradski et al. | 382/103 |
| 6,418,424 B1* | 7/2002 | Hoffberg et al. | 706/21 |
| 2002/0024500 A1* | 2/2002 | Howard | 345/158 |
| 2002/0082079 A1 | 6/2002 | Mantyjarvi et al. | |
| 2002/0181773 A1 | 12/2002 | Higaki et al. | |
| 2003/0018430 A1* | 1/2003 | Ladetto et al. | 701/217 |
| 2003/0109258 A1 | 6/2003 | Mantyjarvi et al. | |
| 2003/0149803 A1* | 8/2003 | Wilson | 710/1 |
| 2003/0156756 A1 | 8/2003 | Gokturk | |
| 2003/0185445 A1 | 10/2003 | Chang et al. | |
| 2004/0166937 A1* | 8/2004 | Rothschild et al. | 463/36 |

FOREIGN PATENT DOCUMENTS

| | | |
|---|---|---|
| GB | 2 358 108 A | 7/2001 |
| WO | WO/0063874 | 10/2000 |
| WO | WO-02/19081 A2 | 3/2002 |
| WO | WO/03001340 | 1/2003 |

OTHER PUBLICATIONS

"Recognizing Human Motion with Multiple Acceleration Sensors"; Jani Mantyjarvi, Johan Himberg, Tapio Seppanen; Nokia Research Center, Finland; University of Oulu, Finland; 2001 IEEE Systems, Man, and Cybernetics Conference; 2001.

S. Kallio et al; "Online Gesture Recognition System for Mobile Interaction;" SMC 2003 Conference Proceedings, 2003 IEEE International Conference on systems, Man and Cybernetics, vol. 3, pp. 2070-2076.

Vesa-Matti Mantyla et al; "Hand gesture recognition of a mobile device user"; 2000 IEEE International Conference on multimedia and Expo; ICME 2000 Proceedings, Latest Advances in the Fast Changing World of Multimedia; vol. 1, pp. 281-284.

Office Action from Canadian Patent Application No. 2,554,917 dated Aug. 13, 2012.

Frantti, T., et al.; "*Fuzzy logic aided gesture recognition;*" Intelligent Data Engineering and Automated Learning, Lecture Notes in Computer Science vol. 2690;, pp. 959-966; dated 2003; abstract retrieved on Jan. 16, 2014 from <http://link.springer.com/chapter/10.1007%2F978-3-540-45080-1_136#>.

Kallio, S., et al.; "*Gesture-based Interaction with Home Appliances;*" The 5th International Workshop on Gesture and Sign Language based Human-Computer Interaction; dated Apr. 2003.

Kallio, S., et al.; "*Online gesture recognition system for HCI of mobile terminals;*" IEEE International Conference on Systems, Man and Cybernetics; dated 2003.

Korpipää, P., et al.; "*An Ontology for Mobile Device Sensor-Based Context Awareness;*" Proceedings of the 4th International and Interdisciplinary Conference on Modeling and Using Context; pp. 451-459; dated Jun. 2003; retrieved on Jan. 17, 2014 from <https://www.researchgate.net/publication/221032199_An_Ontology_for_Mobile_Device_Sensor-Based_Context_Awareness>.

Korpipää, P., et al.; "*Managing Context Information in Mobile Devices;*" IEEE Pervasive Computing, vol. 2, No. 3; pp. 42-51; dated 2003; retrieved on Jan. 16, 2014 from <http://140.127.22.92/download/learn_web/Tong(93-2)—Distribution_Multimedia/database/6-7/Managing%20Context%20Information%20in%20Mobile%20Devices.pdf>.

Mäntylä, V. M.; "*Discrete hidden Markov models with application to isolated user-dependent hand gesture recognition;*" VTT Technical Research Centre of Finland; dated 2001; retrieved on Jan. 17, 2014 from <www.vtt.fi/inf/pdf/publications/2001/P449.pdf>.

Rabiner, L. R., et al.; "*Fundamentals of Speech Recognition;*" Prentice Hall; dated 1993; retrieved on Jan. 17, 2014 from <http://www.cin.ufpe.br/~ags/An%Ellise%20de%20voz%20e%20v%EDdeo/Fundamentals_of_Speech_Recognition.pdf>.

Vehmas, J., et al.; "*EDEMO—Gesture-based Interaction with Future Environments;*" HCI International; Human—Computer Interaction, Theory and Practise (Part II), vol. 2; pp. 786-790; dated 2003.

Office Action for Canadian Application No. 2,554,917; dated Jun. 29, 2009.

Office Action for Canadian Application No. 2,554,917; dated May 27, 2011.

Office Action for Canadian Application No. 2,554,917 dated Mar. 4, 2014.

* cited by examiner

GESTURE CONTROL SYSTEM

CROSS-REFERENCE TO RELATED APPLICATION

This applications claims priority under 35 USC §119 to Finnish patent application number FI 20040184 filed on Feb. 6, 2004.

TECHNICAL FIELD

The invention relates to a control system basing on the use of gestures and functioning especially in mobile terminals. The invention also relates to a mobile terminal comprising the software of a gesture control system.

BACKGROUND OF THE INVENTION

The gesture control system means a system, by means of which the managing of a application, observable with senses, takes place at least partly by hand motions. The control system comprises motion sensors, which move along with the hand of a person using the application, and the converters and processing programs for the signals generated by the motion sensors. The hand motions, or gestures, then are recognized on grounds of e.g. accelerations occurring in the motions. The application controlled by gestures can be for example a game loaded into a mobile terminal or the controlling program of an external electromechanical device. The "application" means in this description and the claims both an observable process and a program, which directly realizes said process.

Recognizing a motion by equipments, as such, is known from before. Recognition systems applying acceleration sensors are disclosed among other documents in the articles "*Recognizing Human Motion with Multiple Acceleration Sensors*" (Mäntyjärvi & kumpp., IEEE International Conference on Systems, Man and Cybernetics, 2001) and "*Recognizing Movements of a Portable Handheld Device Using Symbolic Representation and Coding of Sensor Signals*" (Flanagan et al., International Conference on Mobile and Ubiquitous Multimedia, 2002) and in the publication WO 03/001340. The system in accordance with the last-mentioned publication includes also a gesture library and a program analyzing acceleration data and defining, if that data corresponds to a certain three-dimensional gesture.

Also the controlling of an application by hand motions is known from before. For example the publication WO 00/63874 discloses a system, in which an application changes the shape of a pattern seen in the computer display and moves the pattern, depending on how a control device, to be held in the hand, is handled. The control device comprises acceleration sensors for three dimensions and a button with a pressure sensor.

Figure 1:
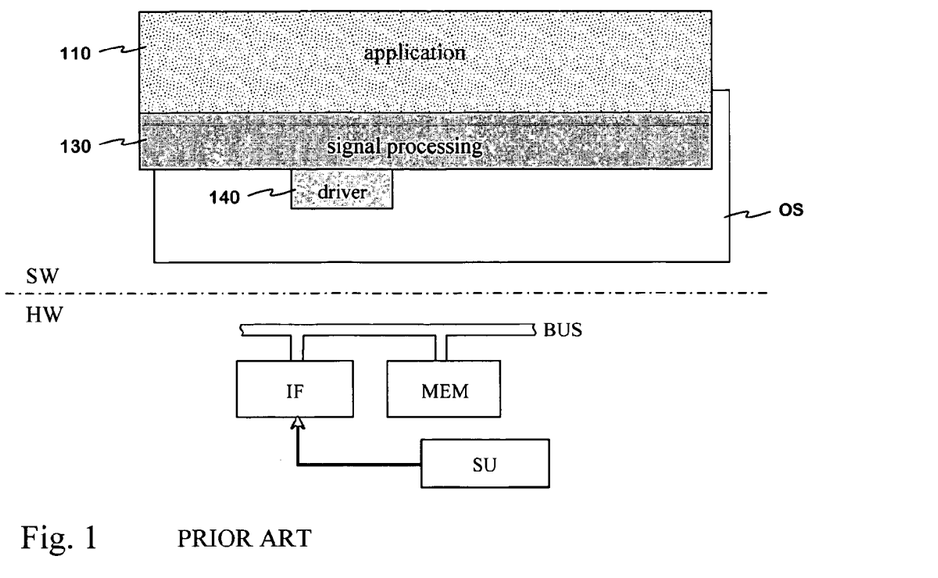
FIG. 1 presents as a layer diagram the interfacing an application to its control system, according to the prior art.

FIG. 1 presents a simplified diagram showing the interfacing an application to its control system, according to the prior art. The whole system comprises a hardware portion HW and a software portion SW. Regarding the hardware portion there is drawn in FIG. 1 a sensor unit SU, an interface IF of the sensor unit, a memory MEM and a computer bus. The software portion comprises a driver 140 for the interface IF, a processing software 130 for the signals which correspond to the hand motions, an application 110 controllable by the hand motions and an operation system OS of the computer at issue. The driver 140 stores the gesture signals, converted to digital form by the interface IF, to the memory MEM. The signal processing software then analyzes the gesture signals and provides a control to the application. Naturally, the signal processing software has to be matched to the application for the data transfer between them.

A flaw in the control systems like the above-mentioned systems is the limited scope of their use: Changing an application to another application presumes amending work in the software of the control system. Likewise transferring the system to another computer of other type requires matching work in the programs.

SUMMARY OF THE INVENTION

Objects of the invention are to reduce said disadvantages related to the prior art and to extend implementing environment of the gesture control systems to the mobile terminals. A system according to the invention is a gesture control system comprising a sensor unit with motion sensors to be held in a user's hand, a processing software of sensor data and an interface program between said processing software and a controllable application, the processing software comprising a trainer to make gesture models and a recognizer to recognize gestures during use of the application, said interface program forming a general purpose interface to get specified commands from the application and to provide specified responses to the application. A mobile terminal according to the invention comprises a control system to manage an application operating in the mobile terminal by gestures, the control system having a processing software of data gotten from motion sensors and an interface program between said processing software and said application.

The basic idea of the invention is as follows: The gesture control system is provided with a general purpose interface with its commands for applications to be controlled. The processing software of the gesture signals includes a training program, and the trained free form gestures made by the user are stored in the gesture library. The processing software of the gesture signals also includes a recognizing program, which matches a gesture made by the user to the stored gestures and chooses the most similar gesture thereof. Gestures can hence be used as commands for controlling any application configured or programmed to receive the command. The system is preferably implemented in a mobile terminal.

An advantage of the invention is that one and the same application functions in different models of mobile terminals without matching relating to the models. This is due to the above-mentioned general purpose interface. Likewise in a certain mobile terminal can be run all applications, which use specified interface commands. Another advantage of the invention is that in a system according to it new and different gestures can easily be formed and put into use. A further advantage of the invention is that it makes possible the controlling by gestures of all possible activities being included in the basic implementation of a mobile terminal. A further advantage of the invention is that it remarkably expands possibilities to interact with game applications in the mobile terminals.

BRIEF DESCRIPTION OF THE DRAWINGS

The invention will now be described in detail. Reference will be made to the accompanying drawings wherein.

DETAILED DESCRIPTION OF THE INVENTION

FIG. 1 was already discussed in connection with the description of the prior art.

Figure 2:
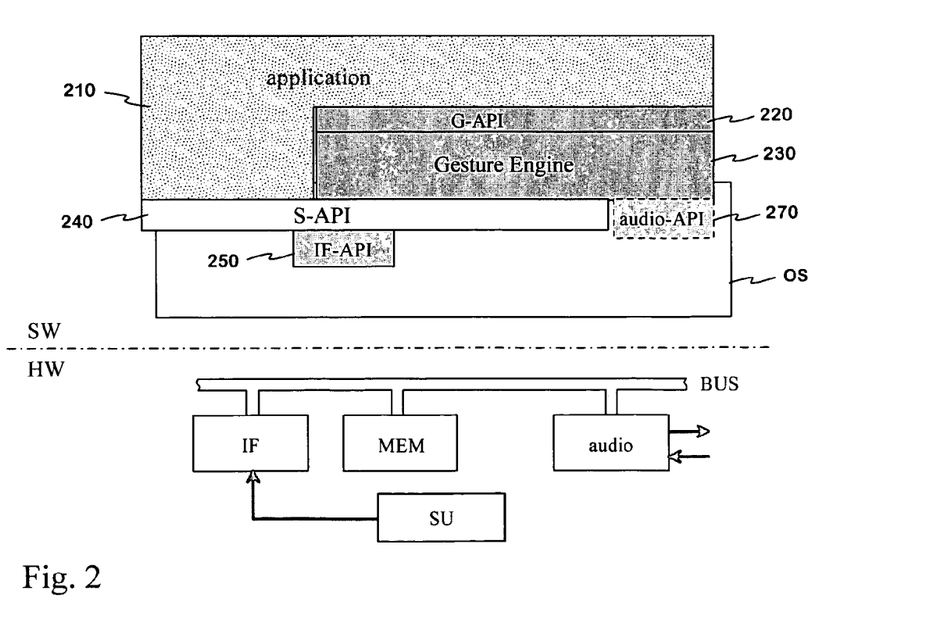
FIG. 2 presents as a layer diagram the interfacing an application to its control system, according to the invention.

FIG. 2 shows a diagram, corresponding to FIG. 1, about the interfacing an application to its control system, according to the invention. The whole system comprises a hardware portion HW and a software portion SW. Regarding the hardware portion there is drawn in the figure, also in this case, a sensor unit SU reacting to the motion, a circuit-based interface IF of the sensor unit, a memory MEM and a computer bus. In addition, there is seen an audio part for possible use of voice messages to the user and/or from the user. The software portion comprises a driver 250 for the interface IF, a sensor interface 240, a processing software 230 for the signals which correspond to the hand motions, an interface 220 between said processing software and an application 210 to be controlled by the hand motions, the actual application 210 and an operation system OS of the device at issue. An optional part in the software SW is audio interface 270 for above-mentioned voice messages. The operation system can be Symbian or Linux, for instance. The processing software for the signals which correspond to the hand motions is more briefly named "Gesture Engine" and different interfaces, or matching programs are named by an abbreviation API (Application Programming Interface). So the driver for the circuit-based interface IF is IF-API, the sensor interface is S-API and the interface between the application and said Gesture Engine is G-API. IF-API together with S-API stores the motion signals, converted to digital form, to the memory MEM. S-API then informs by messages to the Gesture Engine the data at issue, or the sensor data.

The sensor unit SU can be included in a host device or it can be external. In the latter case the transfer system between the sensor unit and interface IF can be based e.g. on Bluetooth or infrared technology, or can be wired. The motion sensors proper can be acceleration sensors or gyroscopes reacting to angular velocity or angular acceleration. They can also be magnetometers, or electronic compasses. In one and the same sensor unit there can occur more than one sensor type. When using acceleration sensors, the number of these is at least two, but preferably three to measure acceleration in each of three dimensions. The sensor unit further can include a button to inform the gesture engine the start and completion of a gesture.

The interface G-API between the application and the Gesture Engine is, as mentioned, general purpose, or standard-like. The application has an interface directly to the sensor interface S-API, too. That interface can be used for application control directly, when an actual signal processing is not needed. The interface G-API, the Gesture Engine and the sensor interface S-API constitute a general purpose platform, on which different applications can be connected. Similarly a certain application can without difficulty be installed to different devices, which have the platform in question.

Figure 3:
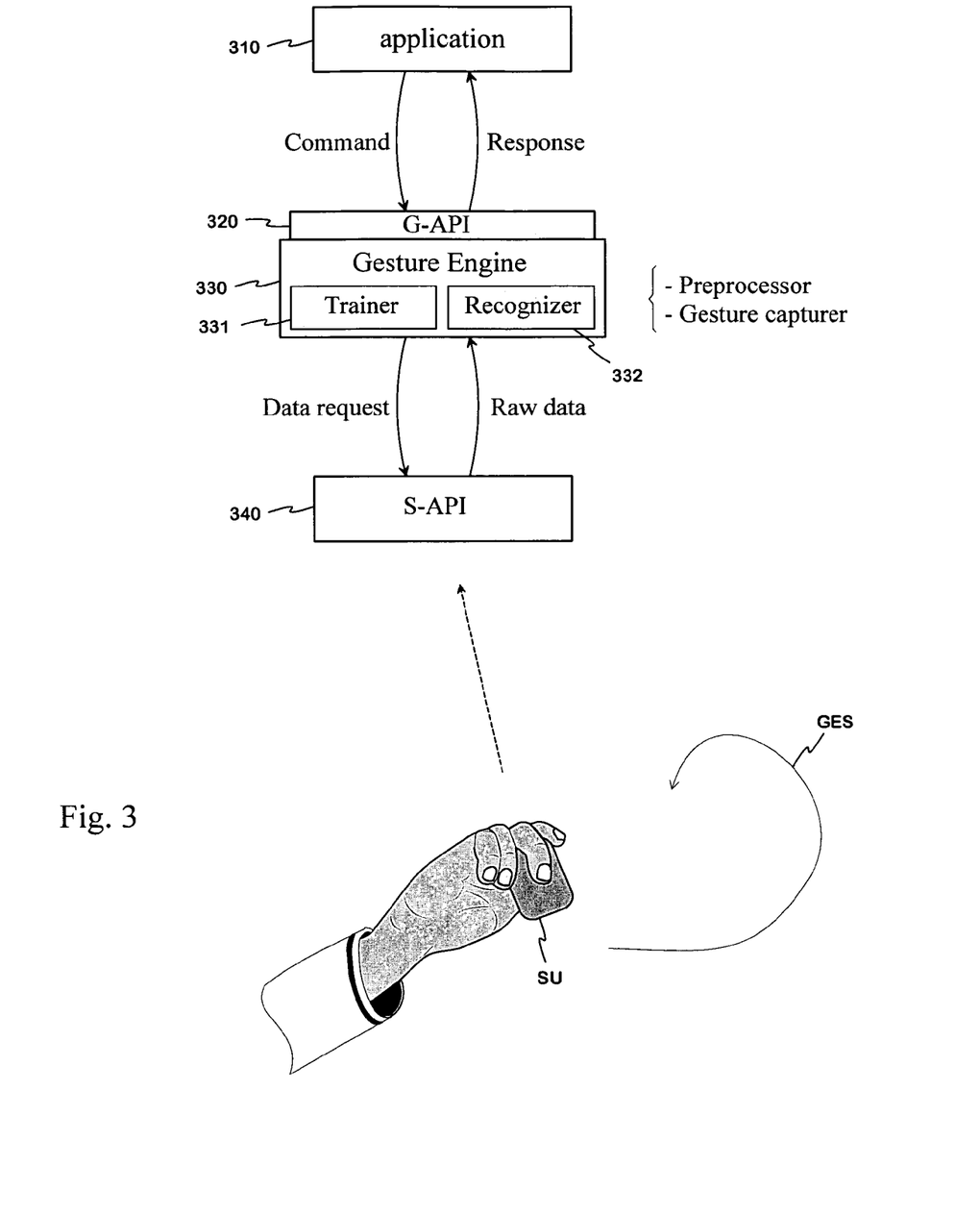
FIG. 3 presents the general principle of the function of a system according to the invention.

FIG. 3 shows the general principle of the function of a system according to the invention. As functional parts there are presented an application 310, the interface thereof 320, Gesture Engine 330 and a sensor interface, or S-API 340. In the Gesture Engine there are seen its main parts Gesture trainer and Gesture recognizer. Both these parts utilize processing modules Preprocessor and Gesture capturer. Certain operation phase starts from a command given by the application to the Gesture Engine. The Gesture Engine gives to the application a response required by the command. Giving a response often presumes information about motions of the motion sensors. For this reason the Gesture Engine gives to S-API a request for sensor data, and S-API answers by informing the data when it can be read in the memory. In FIG. 3 also is seen the sensor unit SU in the hand of a user and an example GES of a hand motion, which causes said data.

The set of the specified commands and responses is as follows, for example. In the table the response corresponding a certain command is to the right from that command.

| | |
|---|---|
| CollectTrainingGesture | TrainingGestureCollected |
| StartGestureTraining | GestureTrained |
| | GestureNotTrained |
| StartGestureRecognition | GestureRecognized |
| | GestureNotRecognized |
| DetectStill | DeviceStill |
| EndGesture | GestureRecognized |
| GetGestureNames | GestureNameList |
| AbortGesture | |
| SubscribeGesture | |
| UnsubscribeGesture | |
| DeleteGesture | |
| RenameGesture | |

Figure 6:
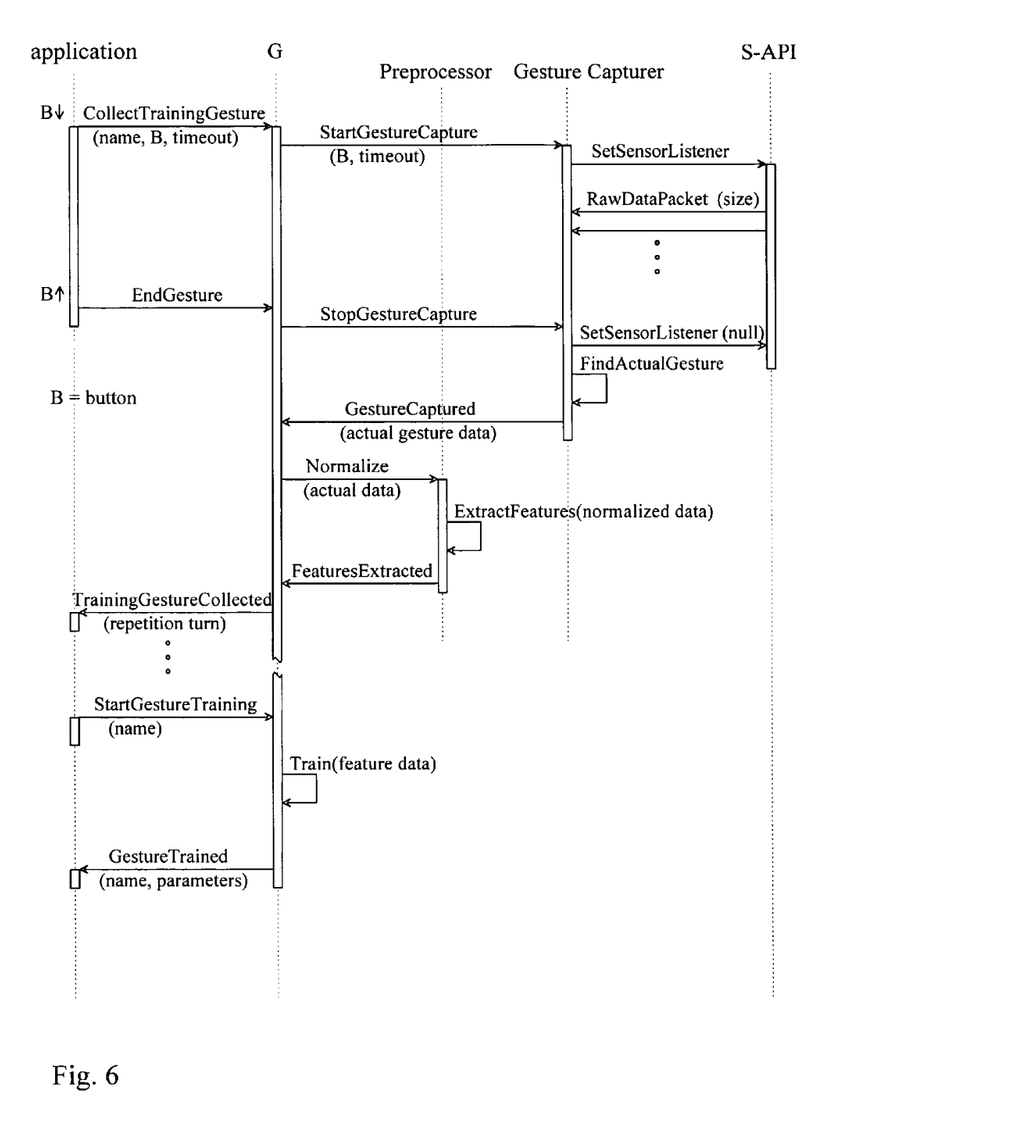
FIG. 6 presents as a sequence diagram an example of a gesture training procedure in a system according to the invention.
Figure 7:
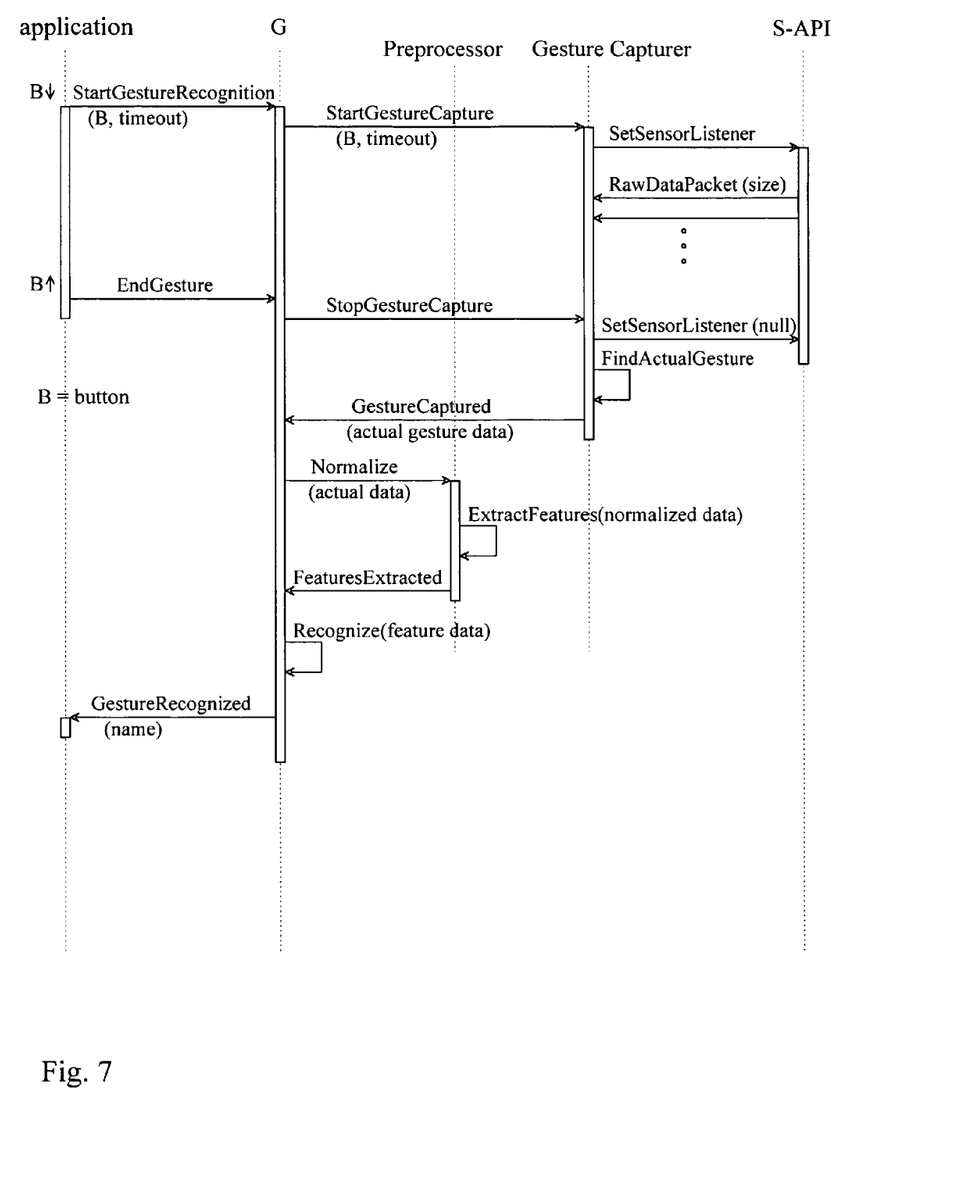
FIG. 7 presents as a sequence diagram an example of a gesture recognizing procedure utilizing a button, in a system according to the invention.
Figure 8:
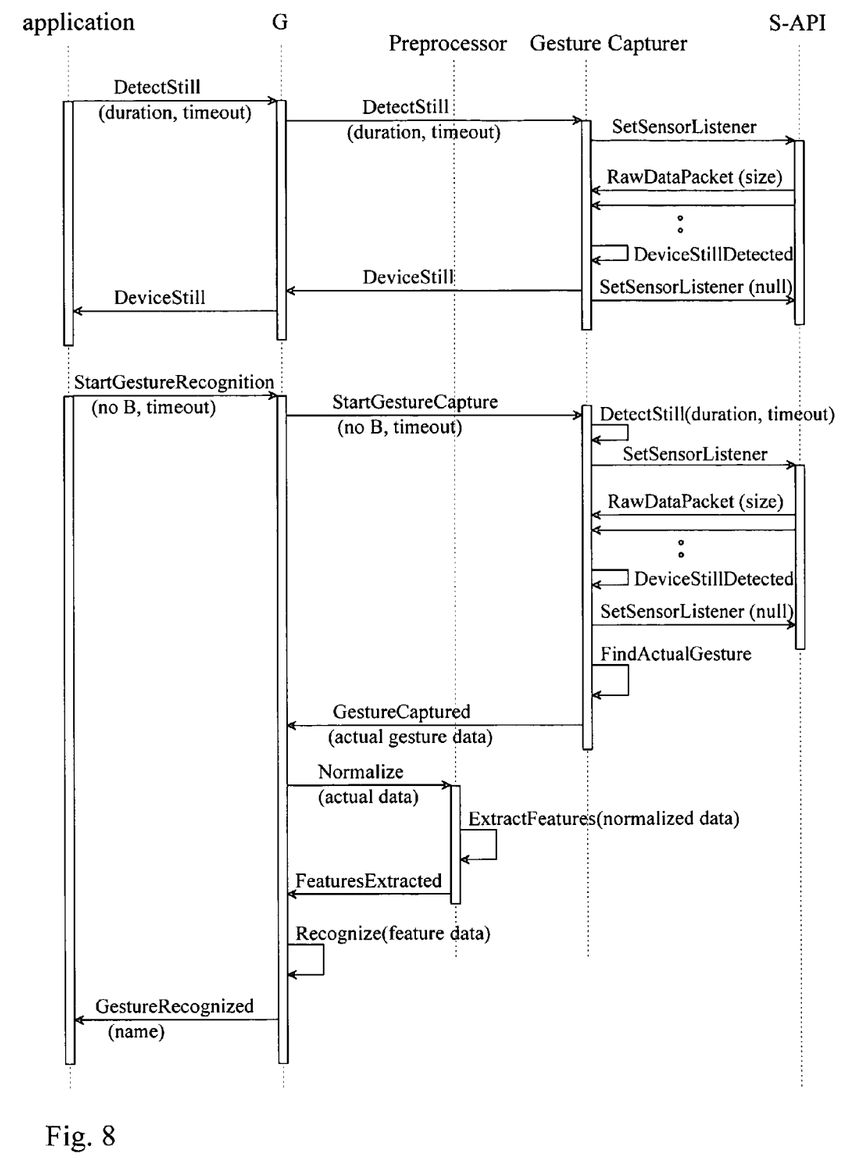
FIG. 8 presents as a sequence diagram an example of a gesture recognizing procedure without a button, in a system according to the invention, and FIGS. 9*a,b* present examples of a mobile terminal according to the invention.

The meaning of most important commands and responses appears more detailed in the descriptions of FIGS. 6-8.

Figure 4:
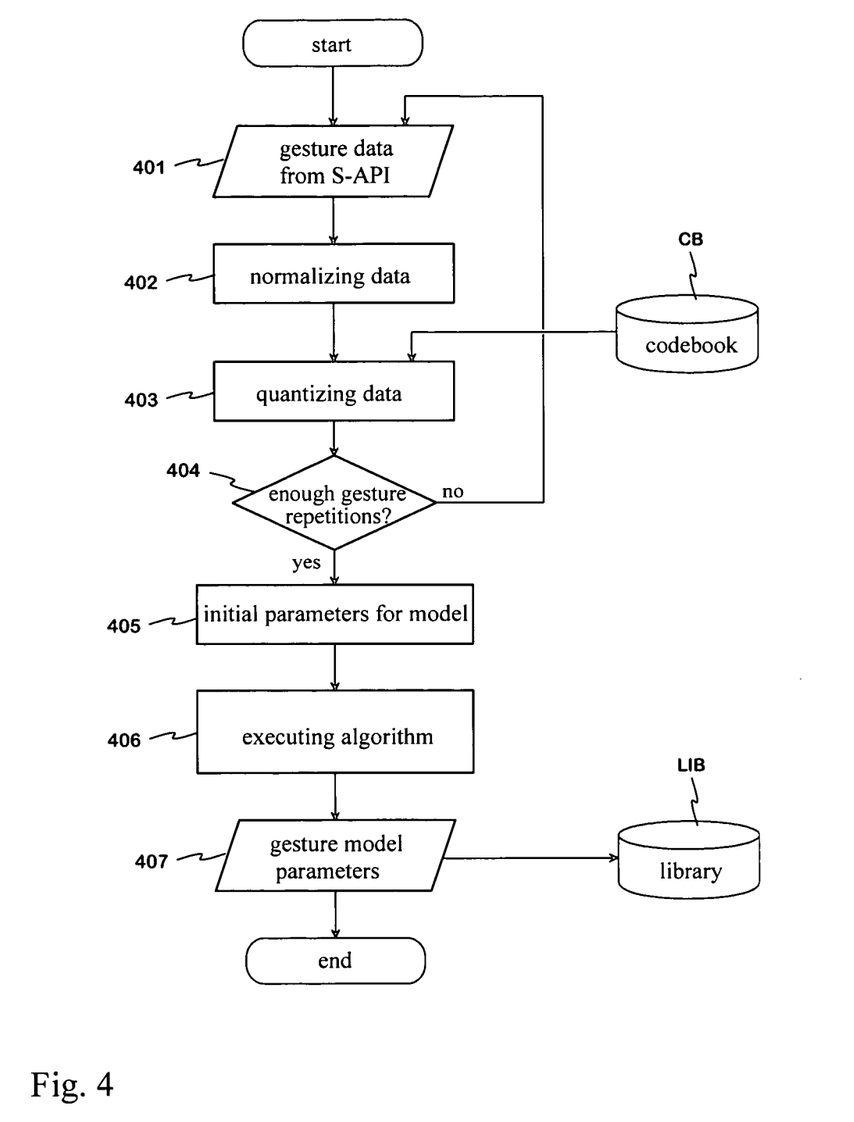
FIG. 4 presents as a flow diagram an example of a gesture training procedure in a system according to the invention.

FIG. 4 presents as a flow diagram an example of a gesture training procedure in a system according to the invention. The procedure as such is known from before. It is based on HMM-algorithm (Hidden Markov Model), which is applied on recognizing e.g. speech and graphological text. In step 401 a person carrying out the training has done a free form hand motion, and the sensor interface S-API provides the sensor data generated by the motion to the Gesture Engine. The data consists of samples of the analog sensor signals, the samples converted to a digital form. There are three sample sequences, each of which corresponds to a motion in one dimension. In step 402 the data is normalized. That means increasing the number of samples by interpolation or decreasing the number of samples by decimation, to achieve the sample sequences of a certain length. In step 403 the data is quantized. This happens by means of a codebook CB containing fixed three-dimensional points, which characterize the space of the gestures. Using such a codebook alleviates the computing load. The result is a one-dimensional token sequence, suitable for the HMM. In step 404 it is checked, whether the gesture being under training has been performed so many times as enough. If not, the above-described steps 401-403 are repeated. If yes, initial parameters are defined for the gesture model on grounds of accumulated, quantized data (step 405). In step 406 a model of the gesture at issue is formed by means of an expedient method such as the Baum-Welch algorithm, in accordance with the HMM. The Baum-Welch algorithm calculates, using probability theory, values for three parameters, which represent the gesture. Each parameter is a matrix containing then plurality of numbers. The obtained parameter values 407 are the result of the training, and they are stored to the gesture library LIB. The Baum-Welch algorithm is iterative by nature. The iteration converges the better the smaller the variation in the source data. However that variation has certain optimum value. If it is clearly lower than the optimum value, the recognition program discards too readily gestures made by the user, and if the variation is clearly higher than the optimum value, the result of the later recognitions is unreliable.

The result of the training can naturally be tested by trying the gesture recognition directly after the training, according to a procedure described below. An estimate for the reliability is obtained by doing several times gestures, which are similar as in the training phase and "something like that". A speech synthesizer, if being included in the device, can be connected to that kind of testing so that the device tells by clear speech the name of the gesture, which it has recognized.

The codebook CB has been created in a blanket way, by means of a separate specific algorithm, which uses among other things gesture data collected from a number of people. The resulting codebook is serviceable to use for various persons without changes. "Generic code book" means here and in patent claims such a codebook. A generic codebook contributes to that also the trained gestures are user-independent. In addition, if a single trained gesture is transferred from a device to another device, it is immediately serviceable in the new environment. Such gestures can be arranged to be loaded through the Internet, and they can be subjects to a charge.

Figure 5:
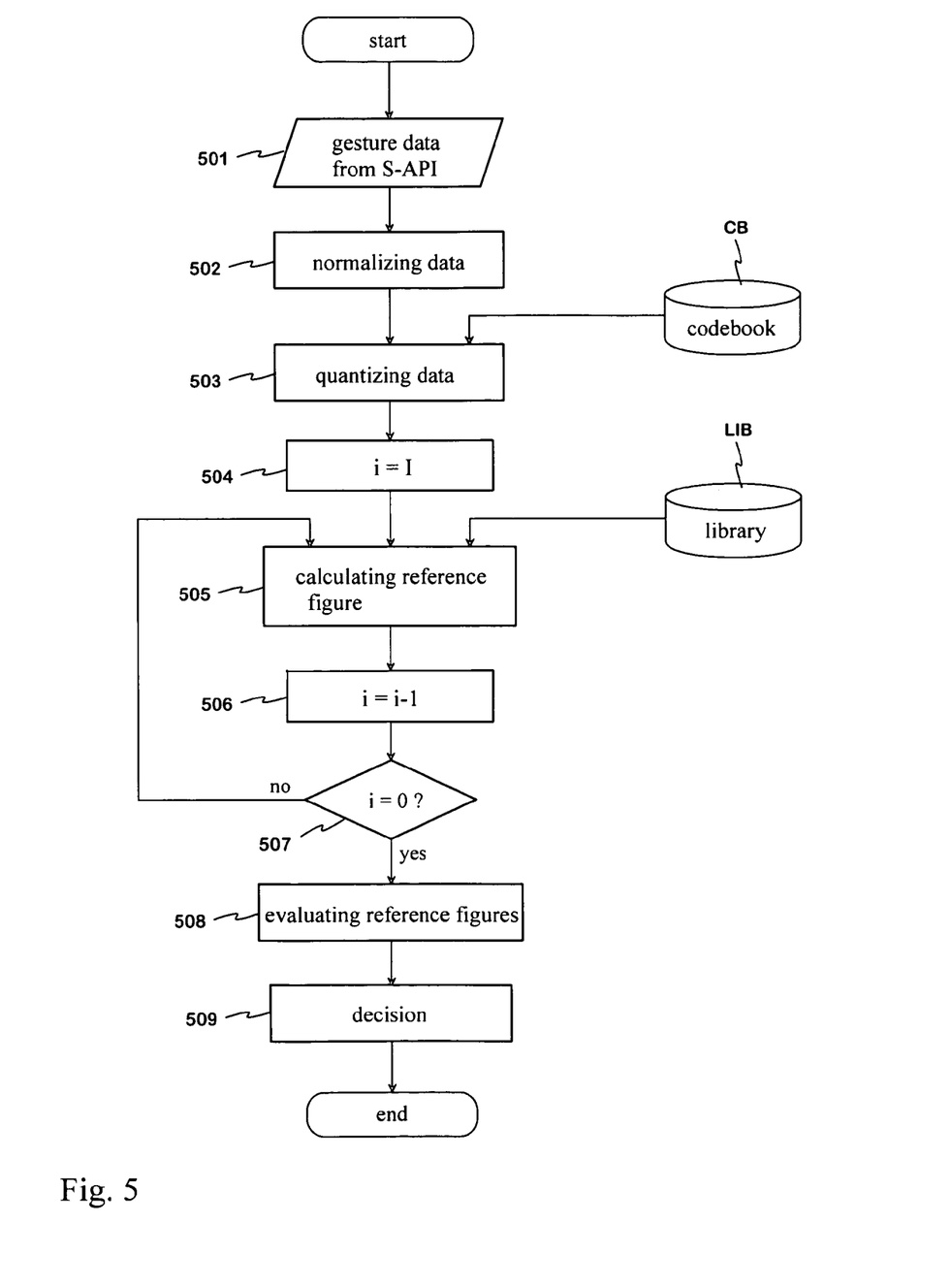
FIG. 5 presents as a flow diagram an example of a gesture recognizing procedure in a system according to the invention.

FIG. 5 presents as a flow diagram an example of a gesture recognizing procedure in a system according to the invention. Also this procedure is based on HMM-algorithm and is known from before as such. In step 501 a person using the system has done a hand motion, and the sensor interface S-API provides the sensor data generated by the motion to the Gesture Engine. Also now the data consists for example of three sample sequences, each of which corresponds to a motion in one dimension. In steps 502 and 503 happen the data normalization and quantization as in steps 402 and 403 of FIG. 4. In step 504 the number I of gestures stored in the gesture library is loaded in a counter. In step 505 a reference figure is calculated, which represents likelihood of the gesture being under recognition with the stored gesture pointed by the counter value. The calculation employs the parameter values defined for the stored gesture at issue, and it is run by means of an expedient method such as the Viterbi algorithm, in accordance with the HMM. Afterwards the counter content is decremented by one (step 506). In following step 507 it is checked, whether the counter value is zero. If not yet, the calculation according to step 505 is repeated, regarding now a new stored gesture. If yes, or all stored gestures are gone through, obtained reference figures are evaluated, step 508. In the evaluation the reference figures are compared with each other and with a certain threshold value. In step 509 a decision is made. If some reference figure is found to be distinctly highest, and it further is higher than said threshold value, the gesture is considered to be recognized. The chosen gesture is the stored gesture corresponding to the reference figure in question. If no one of the reference figures is distinctly highest, or all of them are lower than said threshold value, the gesture is not considered to be recognized.

FIG. 6 presents as a sequence diagram an example of a gesture training procedure in a system according to the invention. In the diagram the vertical dashed lines refer to functional parts of the software. These are, in the order from left to right, an application, "G" which means here the G-API and the upper level of the Gesture Engine together, the Preprocessor, the Gesture Capturer and the S-API. In the diagram the time proceeds downwards. A vertical beam on a dashed line means a period, when the part of the software at issue is active. The example relates to a system, in which the motion sensor unit is equipped with a button. The state information of the button is brought through the S-API to the Gesture Engine and further to the application. The diagram starts by command CollectTrainingGesture provided by the application to the interface G-API. That command has been preceded by the starting of the training procedure in the application and the pressing the button B. The command contains as parameters the name chosen for the gesture to be trained, the button being used and the gesture timeout, which means the maximum time allowed for the collecting of training data. Said command causes command StartGestureCapture to the Gesture Capturer inside the Gesture Engine, and this command in turn command SetSensorListener to the interface S-API. The last-mentioned command contains among other things information at which rate the Gesture Engine will get data packets. Afterwards the S-API provides to the Gesture Capturer the samples of the sensor signals in data packets, in the header of which the size of the packet at a given time is mentioned. That transfer continues, until the button is released. In this case the application provides to the G-API command EndGesture, which results in command StopGestureCapture to the Gesture Capturer inside the Gesture Engine and command SetSensorListener to the S-API. The parameters included in the latter command cause the sampling to stop. The Gesture Capturer gives to its internal module command FindActualGesture, which module cleans the captured raw data deleting, according to certain criteria, from it the parts, which probably do not belong to the actual gesture. That kind of irrelevant data parts come from the small and unintended hand motions before and after the actual gesture. When the irrelevant data is deleted, the Gesture Capturer provides to the upper level of the Gesture Engine response GestureCaptured, by which the actual gesture data is informed. The Gesture Engine then provides to the Preprocessor command Normalize (actual gesture data), which starts the processing of the actual gesture data. The Preprocessor carries out the data normalization and quantization. The latter is started by command ExtractFeatures given to an internal module of the Preprocessor. The Preprocessor then provides to the upper level of the Gesture Engine notice FeaturesExtracted. The data yielded by deleting irrelevant data, normalizing and quantizing is here and in claims called "feature data" in distinction from said raw data. Subsequently the Gesture Engine provides, by the G-API, to the application response TrainingGestureCollected. As a parameter of this response it is mentioned, which repetition turn of the gesture to be trained is in question.

The above-disclosed operation sequence is repeated, when the gesture to be trained is repeated. The number of repetition turns is for instance 2-5. When the repetition is stopped, the application provides to the interface G-API command StartGestureTraining. Parameter of this command is the name of the gesture. The training procedure continues by command Train, given to an internal module of the Gesture Engine. That module carries out the training algorithm, depicted in context of FIG. 4. Finally, the Gesture Engine provides, by the G-API, to the application response GestureTrained. Parameters of this response are the name of the gesture and calculated values of the gesture parameters.

FIG. 7 presents as a sequence diagram an example of a gesture recognizing procedure in a system according to the invention. This example, too, relates to a system, in which the motion sensor unit is equipped with a button, the state information of which is brought through the S-API to the Gesture Engine and further to the application. The diagram starts with command StartGestureRecognition provided by the application to the interface G-API. That command has been preceded by the starting of the recognizing procedure in the application and the pressing of the button B. The command contains as parameters the button being used and the gesture timeout, which means the maximum time allowed for the recognition. Said command causes inside the Gesture Engine command StartGestureCapture to the Gesture Capturer, and this command in turn command SetSensorListener to the interface S-API, as in the training procedure of FIG. 6. Also from that point onwards the operation is equal to FIG. 6 until the Preprocessor provides to the upper level of the Gesture Engine notice FeaturesExtracted. The recognizing procedure then continues so that the Gesture Engine gives to its internal module command Recognize. That module carries out the calculation and evaluation of reference figures, which represent likelihood of the gesture being under recognition with the stored gestures, and makes a decision, as depicted in context of FIG. 5. Subsequently the Gesture Engine provides, by the G-API, to the application response GestureRecognized provided that a gesture indeed has been chosen. As a parameter of that response is the name of the recognized gesture.

FIG. 8 presents as a sequence diagram another example of a gesture recognizing procedure in a system according to the invention. This example relates to a system, in which the motion sensor unit is not equipped with a button or it is at least not used. The diagram starts by command DetectStill, provided by the application to the interface G-API. It is in question a still state of the sensor unit. Because the button is absent, said state has to be separately detected, before storing of meaningful gesture signal can be started. Parameters of that command are the still state duration required and the timeout, which means the maximum time allowed for the still state detection. Said command causes inside the Gesture Engine command DetectStill to the Gesture Capturer, and this command in turn command SetSensorListener to the interface S-API. Afterwards the S-API provides to the Gesture Capturer the samples of the sensor signals in data packets. This transfer continues, until an internal module of the Gesture Capturer observes that the sensor unit has been for a certain period in the still state and gives a notice DeviceStillDetected. The Gesture Capturer provides to the Gesture Engine response DeviceStill and to the S-API command SetSensorListener with a parameter causing the sampling to stop. The Gesture Engine in turn provides by the G-API response DeviceStill to the application.

The procedure continues by command StartGestureRecognition provided by the application to the interface G-API. Command parameters are the matter that no button is used and the gesture timeout, which means the maximum time allowed for the gesture performing. That command causes inside the Gesture Engine command StartGestureCapture to the Gesture Capturer. Based on this command the Gesture Capturer in this case starts the still state detection function and provides to the S-API command SetSensorListener. After that the S-API again provides to the Gesture Capturer the samples of the sensor signals in data packets, which transfer continues, until an internal module of the Gesture Capturer observes that the sensor unit has been a certain period in the still state. The Gesture Capturer then provides to the S-API command SetSensorListener with a parameter causing the sampling to stop and gives to its internal module command FindActualGesture, which module cleans the captured raw data deleting, according to certain criteria, from it the parts, which probably do not belong to the actual gesture. When the irrelevant data is deleted, the Gesture Capturer provides to the upper level of the Gesture Engine response GestureCaptured, by which the actual gesture data is informed. The Gesture Engine then provides to the Preprocessor command Normalize (actual gesture data), which starts the processing of the actual gesture data. The Preprocessor carries out the data normalization and quantization, and provides to the upper level of the Gesture Engine notice FeaturesExtracted, as in the procedures of FIGS. 6 and 7. The recognizing procedure continues from that point as in FIG. 7, when the Gesture Engine carries out the calculation and evaluation of reference figures, which represent likelihood of the gesture being under recognition with the stored gestures, and makes a gesture decision. Finally the Gesture Engine also in this case provides, by the G-API, to the application response GestureRecognized provided that a gesture indeed has been chosen. As a parameter of that response is the name of the recognized gesture.

Also the training procedure can be implemented without a button. In that case the difference with the sequence of FIG. 6 corresponds to the difference between sequences of FIGS. 8 and 7: When the situation presumes, it is waited until the sensor unit is in the still state.

The recognizing procedure can also be extended to concern a series of successive gestures. In that case the recognition of the first gesture happens as in FIG. 8. The recognition of the next gesture starts either immediately without any command from the application or on grounds of a command and after a still state again has been detected.

Figure 9A:
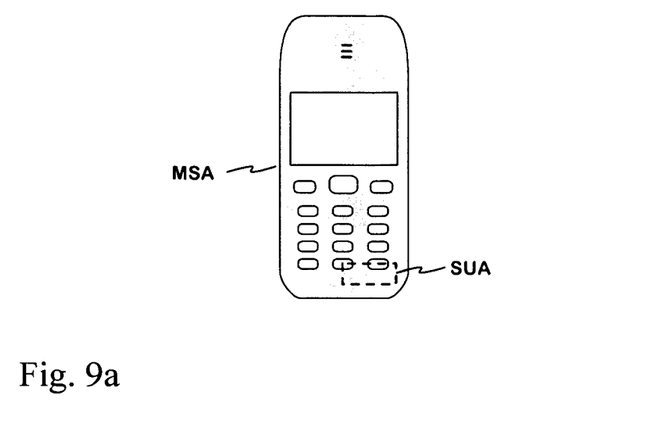

FIG. 9a presents an example of a mobile terminal according to the invention. The mobile terminal MSA has one application or more, controllable by means of gestures. An application can be e.g. an activity being included in the basic implementation of the mobile terminal, such as changing to a certain menu, sending a text message or some camera application. An application also can be a game being originally located in the mobile terminal or loaded later to it. For that kind of applications the mobile terminal is provided with processing software of the gesture signals, which software comprises a trainer for modeling gestures and a recognizer for recognizing gestures. The interface program between the processing software and an application controllable by gestures forms a general purpose interface to get specified commands from the application and to provide specified responses to the application. The sensor unit SUA is placed inside the cover of the mobile terminal. That matter limits the usable applications to be of the type, that do not require watching the display during the gesture control.

Figure 9B:
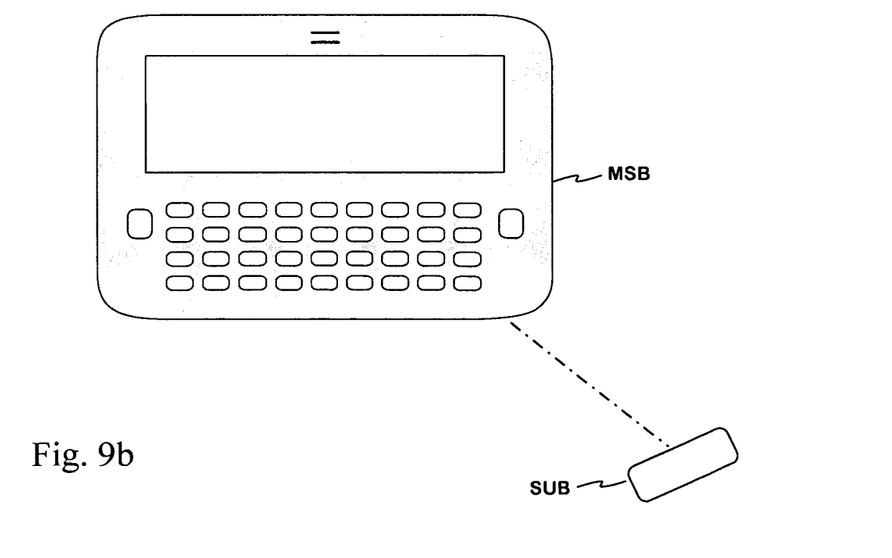

FIG. 9b presents another example of a mobile terminal according to the invention. The mobile terminal MSB is from the view point of invention similar to the mobile terminal MSA in FIG. 9a. The difference is that the sensor unit SUB belonging to the system now is an external device. The data transfer between the sensor unit and the mobile terminal can be based for example on Bluetooth or infrared technology, or can be wired.

As mentioned above, the games form their own group among the applications to be controlled by gestures. A commercial game application can contain the parameter values of the gestures to be used in the game, which values are stored in the gesture library of the Gesture Engine when the game is started. The game may be a spell game by nature, whereupon the hand motions have apparent magical effect on the game events. The gestures can be different by skill level. The tougher gesture a player succeeds to make in a certain situation, the more powerful effect that gesture has. The grading may regard also an individual gesture. Although a player does not succeed to make it well, the Gesture Engine calculates a reference figure and provides it to the application, on condition that the gesture is distinguished from other gestures. The effect on the game is naturally the smaller, the smaller the reference figure is. If a score is calculated for the player, points are granted the more, the tougher gestures he has performed, and the more accurately he has performed those gestures. The game can be played by one or more people. In the latter case the implementation can be a network game such that e.g. two players have the terminals of their own, and the gesture information is transferred to the opponents terminal for instance by using the GPRS (General Packet Radio Service). A player makes e.g. an attack by means of a certain gesture, the opponent sees the attack on his own terminal and defends by trying to make a sufficiently effective counter gesture or a sequence of weaker gestures in a defined time.

A game application can also be executed as a background program so that a player makes something else at the same time. The player e.g. has joined a network game of numbers of players. When an action has been directed at his figure, the game application in the terminal of the player in question displaces other applications and shows what is happening.

Two persons can also play with a single device. In that case there has to be also two sensor units, and each sensor data packet contains information, a data of which player is in question.

A game may also be programmed so that it allows to train and bring new gestures into use. For instance the device is trained in a relatively complicated motion sequence, and the game would simply be such that the players try to repeat the motion sequence, each in turn, and the application gives points. In the description of FIG. 4 it was already explained that user-independent trained gesture models can be transferred from a device to another device through the Internet. For example a network operator can offer a game service such that people having a terminal according to the invention can load trained gesture models therefrom.

A system according to the invention is described above. The implementation of the invention in its different points can naturally deviate from what is presented. The commands and responses of the interface G-API according to the invention can be specified in a different way. Working up the sensor data to a form suitable for the HMM can be implemented also by some other process than by data normalization and quantization subsequent thereto, occurring in FIGS. 4 and 5. For both training and recognizing can be used, instead of the whole HMM, some other solution, such as neural network or Bayesian network technology. The starting and completing of a gesture can be informed, instead of a button, e.g. by voice control in the case of devices, which have speech recognition activity. Voice messages can also be used in contrary direction so that an application informs via Gesture Engine the user of certain situations by means of the device's audio part and speaker. For that purpose there is also a command of its own.

What is claimed is:

1. A method comprising:
receiving a representation of a training hand gesture by capturing at least two three-dimensional points of the training hand gesture;
receiving an indication of a command;
associating the training hand gesture with the command;
with a processor, in response to identifying a subsequent hand gesture as the training hand gesture, executing the command; and
calculating a likelihood of the training hand gesture to be recognized, based on the training hand gesture and at least one additional trained hand gesture.

2. A method according to claim 1, wherein capturing a training hand gesture comprises:
capturing at least one repetition of the training hand gesture; and
normalizing the repetitions.

3. A method according to claim 1, wherein identifying a subsequent hand gesture comprises accessing a codebook of hand gestures provided by more than one user.

4. A method according to claim 1, further comprising:
causing transmission of the training hand gesture and associated command to a device different from a device on which the training hand gesture is captured.

5. An apparatus comprising at least one processor and at least one memory including computer program code, the at least one memory and the computer program code configured to, with the processor, cause the apparatus to at least:
receive an indication of a training hand gesture by capturing at least two three-dimensional points of the training hand gesture;
receive an indication of a command;
associate the training hand gesture with the command;
in response to identifying a subsequent hand gesture as the training hand gesture, execute the command; and
calculate a likelihood of the training hand gesture to be recognized, based on the training hand gesture and at least one additional trained hand gesture.

6. An apparatus according to claim 5, wherein capturing a training hand gesture comprises:
capture at least one repetition of the training hand gesture; and
normalize the repetitions.

7. An apparatus according to claim 5, wherein identifying a subsequent hand gesture comprises accessing a codebook of hand gestures provided by more than one user.

8. An apparatus according to claim 5, wherein the computer program code is further configured to, with the processor, cause the apparatus to:
cause transmission of the training hand gesture and associated command to a device different from a device on which the training hand gesture is captured.

9. A computer program product comprising at least one non-transitory computer-readable storage medium having computer-executable program code instructions stored therein, the computer-executable program code instructions comprising program code instructions to:
receive an indication of a training hand gesture by capturing at least two three-dimensional points of the training hand gesture;
receive an indication of a command;
associate the training hand gesture with the command;
in response to identifying a subsequent hand gesture as the training hand gesture, execute the command; and
calculate a likelihood of the training hand gesture to be recognized, based on the training hand gesture and at least one additional trained hand gesture.

10. A computer program product according to claim 9, wherein capturing a training hand gesture comprises:
capture at least one repetition of the training hand gesture; and
normalize the repetitions.

11. A computer program product according to claim 9, wherein identifying a subsequent hand gesture comprises accessing a codebook of hand gestures provided by more than one user.

12. A computer program product according to claim 9, wherein the computer-executable program code instructions further comprise program code instructions to:

cause transmission of the training hand gesture and associated command to a device different from a device on which the training hand gesture is captured.

* * * * *